(12) United States Patent
Lam et al.

(10) Patent No.: US 8,936,218 B2
(45) Date of Patent: Jan. 20, 2015

(54) AIRCRAFT FUEL TANK VENT

(75) Inventors: Joseph K-W Lam, Bristol (GB); Franklin Tichborne, Bristol (GB); Simon Masters, Bristol (GB); David Parmenter, Uckfield (GB)

(73) Assignee: Airbus Operations Limited, Bristol (GB)

( * ) Notice: Subject to any disclaimer, the term of this patent is extended or adjusted under 35 U.S.C. 154(b) by 431 days.

(21) Appl. No.: 13/216,289

(22) Filed: Aug. 24, 2011

(65) Prior Publication Data

US 2012/0048413 A1 Mar. 1, 2012

(30) Foreign Application Priority Data

Aug. 26, 2010 (GB) .................................. 1014224.8

(51) Int. Cl.
*B64D 37/10* (2006.01)
*B64D 37/32* (2006.01)
*B64D 37/04* (2006.01)
*B64C 3/34* (2006.01)

(52) U.S. Cl.
CPC ................ *B64D 37/10* (2013.01); *B64D 37/32* (2013.01); *B64C 3/34* (2013.01); *B64D 37/04* (2013.01)
USPC .................................................... 244/135 R

(58) Field of Classification Search
USPC ...................................................... 244/135 R
See application file for complete search history.

(56) References Cited

U.S. PATENT DOCUMENTS

| 3,275,061 | A  | * | 9/1966  | Williams et al. | ............... 137/263  |
| 3,279,522 | A  | * | 10/1966 | Norris et al.   | ................... 137/256 |
| 3,419,233 | A  | * | 12/1968 | Wotton          | ...................... 244/135 R |
| 4,913,380 | A  | * | 4/1990  | Vardaman et al. | ........ 244/135 R |
| 7,040,579 | B2 | * | 5/2006  | Howe            | .......................... 244/135 R |
| 7,357,355 | B2 | * | 4/2008  | Howe            | .......................... 244/135 R |
| 7,621,483 | B2 | * | 11/2009 | Cozens et al.   | ............ 244/135 R |
| 7,857,260 | B2 | * | 12/2010 | Morgia et al.   | .................. 244/136 |
| 8,485,210 | B2 | * | 7/2013  | Minty           | ............................... 137/1 |
| 2003/0218098 | A1 |  | 11/2003 | Goto et al.     |  |
| 2005/0241700 | A1 |  | 11/2005 | Cozens et al.   |  |
| 2008/0173763 | A1 | * | 7/2008  | Morgia et al.   | .............. 244/135 R |
| 2011/0147530 | A1 | * | 6/2011  | Rahman et al.   | ........... 244/135 R |
| 2011/0284694 | A1 | * | 11/2011 | Yamaguchi et al.| ....... 244/135 R |

FOREIGN PATENT DOCUMENTS

| EP | 1591359 A1 | 2/2005 |
| GB | 1128377 A  | 9/1968 |

OTHER PUBLICATIONS

British Search Report for 1014224.8 dated Dec. 14, 2010.

* cited by examiner

*Primary Examiner* — Joseph W Sanderson
(74) *Attorney, Agent, or Firm* — Lowe Hauptman & Ham, LLP

(57) ABSTRACT

An aircraft having a dihedral wing configuration with a wing fuel tank and a vent system for ventilating the fuel tank, the vent system including a combined vent-surge tank disposed inboard of at least part of the wing fuel tank, a vent fluidically connecting the vent-surge tank to ambient, and a vent line fluidically connecting the upper part of the fuel tank to the combined vent-surge tank, wherein the vent line has its lowest point at the combined vent-surge tank.

17 Claims, 1 Drawing Sheet

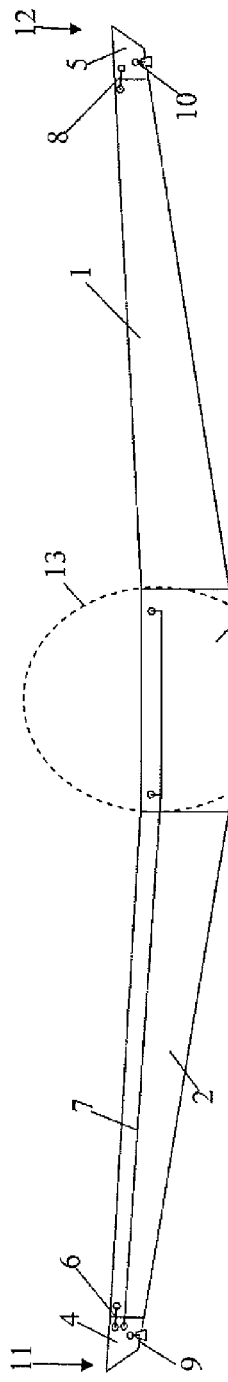
Figure 1 - Prior Art
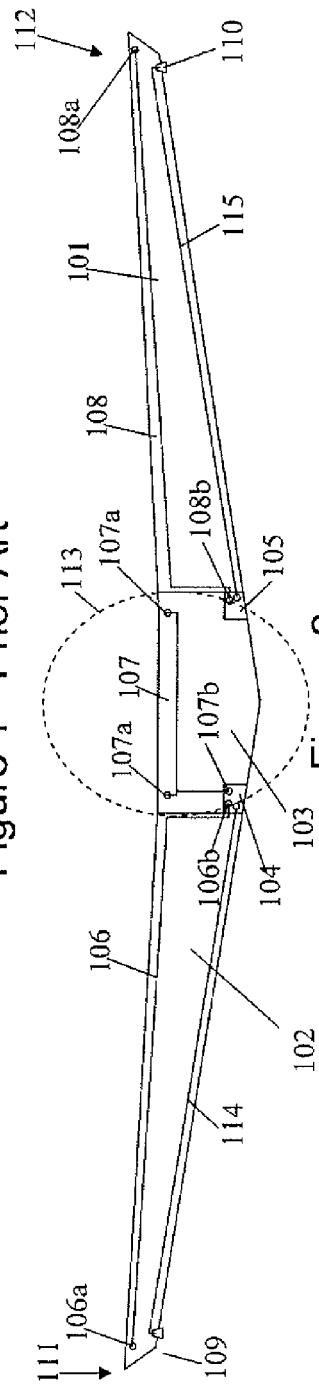
Figure 2
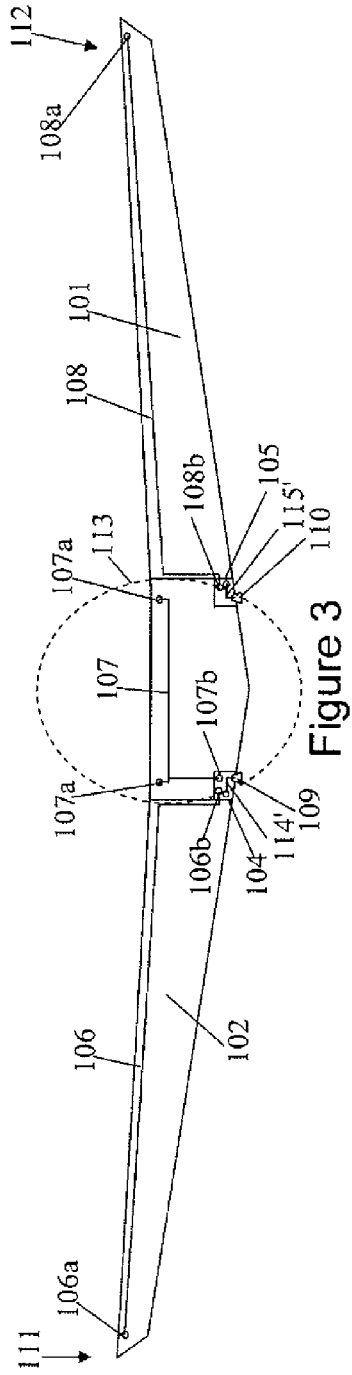
Figure 3

AIRCRAFT FUEL TANK VENT

RELATED APPLICATIONS

The present application is based on, and claims priority from, British Application Number 1014224.8, filed Aug. 26, 2010, the disclosure of which is hereby incorporated by reference herein in its entirety.

FIELD OF THE INVENTION

The present invention relates to an aircraft having a dihedral wing configuration with a wing fuel tank and a vent system for ventilating the fuel tank.

BACKGROUND OF THE INVENTION

Vent systems are employed on aircraft to perform fuel system pressure equalisation and allow the safe management of air and fuel quantities and pressure within fuel tanks. Air is drawn into the tank when fuel is consumed, during descent and jettison. Air passes out of the tank during refuel and ascent.

FIG. 1 illustrates a schematic vertical section view of a prior art aircraft fuel system having a ventilation system. The fuel system includes a three-tank configuration including left and right lateral wing tanks 1, 2, and a centre wing tank 3. The ventilation system includes left and right vent-surge tanks 4, 5; a vent line 6 connecting the left lateral wing tank 2 to the left vent-surge tank 4; a vent line 7 connecting the centre wing tank 3 to the left vent-surge tank 4; and a vent line 8 connecting the right lateral wing tank 1 to the right vent-surge tank 5. The vent-surge tanks 4, 5 each include a NACA duct 9, 10, which opens to ambient from the lower aerodynamic surface adjacent the wing tips 11, 12.

The vent lines 6, 7, 8 are open at each end and allow the passage of air and/or fuel to the vent-surge tanks 4, 5. The vent lines 6, 7, 8 connect the fuel tank ullage (the space above the liquid fuel in the tanks 1, 2, 3) to ambient via the vent-surge tanks 4, 5 and their respective NACA ducts 9, 10. In the event of overfilling of the fuel tanks 1, 2, 3, or manoeuvring with full tanks, excess fuel can pass along the vent lines 6, 7, 8 into the vent-surge tanks 4, 5. The vent-surge tanks 4, 5 retain fuel surge and prevent ejection overboard.

The aircraft fuel system shown in FIG. 1 is for an aircraft with a dihedral wing configuration. Aircraft with a dihedral wing configuration commonly have the vent lines 6, 7, 8 descending from the wing tips 11, 12 toward the fuselage 13. The vent lines 6, 7, 8 connect between the upper part of the fuel tanks 1, 2, 3 and the upper part of the vent-surge tanks 4, 5.

The vent-surge tank 4, 5 capacity is proportioned according to the volume of the vent lines 6, 7, 8, to accommodate fuel which spills into it during manoeuvring or refuel. Each NACA duct 9, 10 has a vent inlet of NACA form to give ram pressure recovery to the tanks 1, 2, 3 and fuel system. The NACA duct assembly also accommodates a flame arrestor to prevent external ignition sources from entering the fuel system.

Additionally, the fuel system typically includes a fuel scavenge system, a plurality of drain valves, check valves, float vent valves, overpressure burst discs and pipe geometry.

Water is an unavoidable contaminant in fuel. It can affect fuel system component reliability and lead to operational delays and increased maintenance activities. In addition, the propensity for microbiological contamination is directly proportional to the presence of water and the temperature within fuel tanks. Sources of water in aircraft fuel tanks is from fuel loaded into the aircraft fuel tanks during refuel (dissolved water) and from air entering the aircraft fuel tanks via its ventilation system. It is estimated that up to 50% of water in the fuel of aircraft fuel tanks is currently entering via the ventilation system, depending on atmospheric conditions.

During cruise, the fuel level decreases steadily as the engines consume the fuel. A decrease in the fuel level causes an increase in the ullage volume, and excess air is drawn in from ambient via the ventilation system to equalise pressures. At cruise, the ambient air is relatively cold and dry.

During descent, due to increasing ambient pressure as the aircraft descends, air contracts in the ullage. This results in a net inflow of ambient air through the ventilation system. The ingress of ambient air during descent brings relatively warm, humid air into the fuel system, and hence a significant volume of water enters the fuel tanks via the ventilation system.

Referring once again to FIG. 1, the vent lines 6, 7, 8 include a plurality of one-way duck-bill valves (not shown) along their length. Water condenses out of the air in the vent lines and the one-way valves allow this water to freely drip into the fuel tanks. The fuel system also includes a scavenging jet pump (not shown) in each of the vent-surge tanks 4, 5, which extracts fuel and/or water from the vent-surge tanks 4,5 and returns this to the fuel tanks 1, 2, 3.

As can be seen, conventional fuel systems are designed to direct a significant amount of water into the fuel tanks. Water in suspension in the fuel will ultimately be fed to the engines to be "burnt off" with the fuel, but some of the water in the fuel tanks will condense out and pool at the low points of the tank(s). Water drain valves in the tanks require periodic maintenance to drain off the water, which is costly and time consuming. In addition, there is a risk of the water turning to ice, which can affect fuel system component reliability.

The Airbus A380 aircraft has a vent system configured differently to that described above with reference to FIG. 1, with the vent and surge tank being segregated from one another. The reason for the difference is not related to water management but to wing bending relief. The surge tank is positioned further inboard than the vent tank which remains at the wing tip. The Airbus A380 is currently certified and in-service with this un-orthodox vent system.

US2005/0241700A1 presents a proposed "improved fuel storage and venting system" with a venting chamber located central to the aircraft and surge tanks located at each wing tip. Fuel surge/overflow is fed via the central vent tank to each respective wing surge tank. This document describes that the vent system may be applied to a dihedral wing—however the application has been designed for application to an anhedral winged aircraft. The venting system is also inerted using external air as source.

There is a need in the art for a system for improving the management of water within aircraft fuel systems, more specifically aircraft fuel system tanks and venting systems.

SUMMARY OF THE INVENTION

A first aspect of the invention provides an aircraft having a dihedral wing configuration with a wing fuel tank and a vent system for ventilating the fuel tank, the vent system comprising: a combined vent-surge tank disposed inboard of at least part of the wing fuel tank; a vent fluidically connecting the combined vent-surge tank to ambient; and a vent line fluidically connecting the upper part of the fuel tank to the combined vent-surge tank, wherein the vent line has its lowest point at the combined vent-surge tank.

The invention is advantageous in that the aircraft fuel tank vent system design adopts an inboard vent-surge tank configuration, and water ingested through the vent system is prevented from running into the fuel tank by reconfiguring the vent line architecture. The invention therefore minimises the amount of water entering the fuel system via the vent system. The invention is only applicable to dihedral wing aircraft. Water and fuel in the vent system drains under gravity into the inboard vent-surge tank, rather than into the fuel tank.

In a preferred embodiment, the wing fuel tank is a lateral wing fuel tank, and the vent-surge tank is located inboard of at least part of the lateral wing fuel tank.

The aircraft may further comprise a centre wing fuel tank, wherein the vent system is further configured to ventilate the centre wing tank. A centre tank vent line may fluidically connect the upper part of the centre wing tank to the vent-surge tank. The centre tank vent line may have its lowest point at the vent-surge tank. The vent-surge tank may be located within the centre wing tank. Alternatively, the vent-surge tank may be located within the lateral wing tank.

A scavenging system for scavenging liquid from the bottom of the vent-surge tank may be provided.

The vent may include a duct having an ambient opening. The duct may open to ambient from a lower aerodynamic surface of the aircraft. The duct may be a NACA duct or scoop.

The duct may be disposed external to and outboard of the vent-surge tank. For example, the duct may be disposed adjacent the wing tip. A duct vent line may fluidically connect the duct to the vent-surge tank. The duct vent line may pass through the fuel tank. The duct vent line may have its lowest point at the vent-surge tank. In this way, water condensate within the duct vent line can drain under gravity into the vent-surge tank. Alternatively, the duct may be disposed near the wing semi-span position (e.g. for a rear mounted engine aircraft configuration) to reduce the vent line length connecting the duct to the vent-surge tank and hence weight.

In an alternative embodiment, the duct may be disposed in the vent-surge tank. This would reduce vent line length, and hence weight, to a minimum. However, positioning the duct outboard is generally preferred as this improves aerodynamic efficiency and any exceptional fuel spillage from the duct would be far away from the fuselage.

Coatings may be provided on vent system interior surfaces to facilitate the management of vent-ingested water. The coatings preferably limit the growth of harmful air-borne contamination, which may settle on the surface of vent ingested water and make the water its habitat.

BRIEF DESCRIPTION OF THE DRAWINGS

Embodiments of the invention will now be described with reference to the accompanying drawings, in which:

FIG. 1 illustrates a schematic vertical section view of a prior art aircraft fuel tank vent system;

FIG. 2 illustrates a schematic vertical section view of an aircraft fuel tank vent system in accordance with a first embodiment of this invention; and FIG. 3 illustrates a schematic vertical section view of an aircraft fuel tank vent system in accordance with a second embodiment of this invention.

DETAILED DESCRIPTION OF EMBODIMENT(S)

FIG. 2 illustrates a schematic vertical section view of an aircraft having a dihedral wing and a fuel system having a three wing fuel tank configuration. The fuel system includes left and right lateral wing tanks 101, 102, and a centre wing tank 103. The fuel tanks are ventilated by a ventilation system comprising left and right vent-surge tanks 104, 105; a vent line 106 connecting the left lateral wing tank 102 to the left vent-surge tank 104; a vent line 107 connecting the centre wing tank 103 to the left vent-surge tank 104; and a vent line 108 connecting the right lateral wing tank 101 to the right vent-surge tank 105. The left and right vent-surge tanks 104, 105 are located inboard of the lateral wing tanks 101, 102. The vent-surge tanks 104, 105 are sealed tanks located within the centre wing tank 103. The vent-surge tanks 104, 105 may alternatively be disposed adjacent the centre tank 103 but within the lateral wing tanks 101, 102.

A NACA duct assembly 109, 110 is located at each wing tip 111, 112. Each NACA duct assembly 109, 110 includes an inlet which opens to ambient from the lower aerodynamic surface of the wing. The left NACA duct assembly 109 is fluidically connected to the interior of the left vent-surge tank 104 by vent line 114, and the right NACA duct assembly 110 is fluidically connected to the interior of the right vent-surge tank 105 by vent line 115. The vent lines 114, 115 pass through the lower part of the lateral wing tanks 101, 102.

The vent lines 106, 107, 108 are open at each end and allow the passage of air and/or fuel from the fuel tanks 101, 102, 103 to the vent-surge tanks 104, 105. The vent lines 106, 107, 108 connect the fuel tank ullage (the space above the liquid fuel in the tanks) to ambient via the vent-surge tanks 104, 105 and their associated NACA duct assemblies 109, 110. The NACA duct assemblies 109, 110 are disposed at the wing tips 111, 112 and are therefore high up above ground level when the aircraft is on the ground, so reducing the risk of foreign objects (such as water, debris etc) being ingested into the NACA duct.

The vent line 106 has a first end 106a which opens into the upper part of the left lateral wing tank 102 adjacent the wing tip 111, and a second end 106b which opens into the interior of the left vent-surge tank 104. The end 106b is at the lowest vertical height of any point along the vent line 106. The centre vent line 107 has two openings 107a in the upper part of the centre wing tank 103 at each lateral side of the centre wing tank 103.

The other end 107b of the centre vent line 107 opens in the interior of the left vent-surge tank 104. The end 107b is at the lowest vertical height of any point on the centre vent line 107. The vent line 108 has a first end 108a which opens into the upper part of the right lateral wing tank 101 adjacent the wing tip 112, and a second end 108b which opens into the interior of the right vent-surge tank 105. The end 108b is at the lowest vertical height of any point on the vent line 108.

As can be seen, each of the vent lines 106, 107, 108 have openings at the highest points in their respective wing fuel tanks 101, 102, 103 and are inclined downwardly towards the vent-surge tanks 104, 105. In the event of over-filling the fuel tanks 101, 102, 103, or manoeuvring with full tanks, excess fuel can pass along the vent lines 106, 107, 108 into the vent-surge tanks 104, 105. The vent-surge tanks 104, 105 retain fuel surge and prevent ejection overboard. The vent lines 114, 115 connecting the interior of the vent-surge tanks 104, 105 to their respective NACA duct assemblies 109, 110 are inclined upwardly from the respective vent-surge tanks 104, 105 towards the NACA duct assemblies 109, 110. The end of each vent line 114, 115 at the respective vent-surge tank 104, 105 is at the lowest vertical height of any point on the vent lines 114, 115.

The vent lines 106, 107, 108 do not include any water drain valves and so any liquid, such as water or fuel, which condenses out or flows into the vent lines 106, 107, 108 drains under gravity into the vent-surge tanks 104, 105. Similarly, any water condensate which forms in the vent lines 114, 115 drains under gravity into the vent-surge tanks 104, 105.

When there is a net inflow of ambient air through the ventilation system, for example as the aircraft descends, ingress of relatively warm, humid ambient air into the NACA duct assemblies 109, 110 passes along the vent lines 114, 115 into the vent-surge tanks 104, 105 and then via vent lines 106, 107, 108 before entering the ullage of the fuel tanks 101, 102, 103. Due to the relatively long vent lines 106, 107, 108, 114, 115 water vapour in the ingress humid ambient air will mostly condense in the cool vent lines and flow under gravity into the vent-surge tanks 104, 105. The temperature within aircraft fuel tanks during descent will typically be low since the aircraft will be descending from high cruise altitude where the ambient temperature is low. In this way, the water content of air flowing into the ullage of the fuel tanks 101, 102, 103 via the vent line openings 106a, 107a, 108a will be greatly reduced. Therefore, the amount of water entering the fuel tanks 101, 102, 103 via the vent system is minimised.

The vent-surge tanks 104, 105 have a water/fuel scavenge system (not shown) to scavenge water collected in, and fuel over-spilled into, the vent-surge tanks 104, 105. The scavenged fluid is mixed with fuel from the fuel tank at an appropriate ratio before being fed to the engines when appropriate. Management of water within the fuel system can therefore be greatly simplified as the condensed water from the ventilation system is collected in a central location within the vent-surge tanks 104, 105. The scavenge pump will typically be switched off during descent. Settled water may alternatively by siphoned from the vent-surge tank by a suitable valve arrangement.

Interior surfaces of the vent system, such as the vent-surge tanks, may be coated with a suitable anti-microbial coating, e.g. silver ion nano-particles. The coatings limit the growth of harmful micro-biological contamination, which could otherwise lead to fuel system deterioration or malfunction. The coatings may be of a permanent or dissolving type and are available with a variety of properties and strengths. Dissolving coatings are generally less expensive and but carry the additional cost of replenishment at major aircraft maintenance intervals, e.g. every few years. The coating sterilises the condensed water in the vent-surge tanks.

Water which condenses out of the fuel in the tanks is generally sterilised and so long as it does not come into direct contact with air, it will remain sterilised. However, water which condenses out in the vent system may contain micro-biological contamination since it is in direct contact with air. In the prior art ventilation system described with reference to FIG. 1, the condensed water from the ventilation system will enter the fuel tanks, which could contaminate the fuel. The improved ventilation system architecture described above with reference to FIG. 2 ensures that most of the water condensate from the ventilation system will be collected in the vent-surge tanks and will not enter the fuel tanks. This leaves the fuel tanks with little condensed water from ingress humid air, so reducing the risk of micro-biological contamination in the fuel tanks. Any water scavenged from the vent-surge tanks that is fed into the fuel tanks should be free of micro-biological contamination due to the anti-microbial coating.

The vent-surge tanks 104, 105 shown in FIG. 2 are located inside the fuselage 113. This is advantageous since the fuselage contains numerous heat sources which act to prevent freezing of the water which collects within the vent-surge tanks 104, 105.

Whilst in the first embodiment described above with reference to FIG. 2 the total length of vent line pipework is slightly increased compared with the prior art configuration described with reference to FIG. 1, it will be appreciated that the vent line pipework performs the additional job of managing the ingress water in the vent system and so provides an overall benefit. As a result of this improved water management, it may be possible to extend the water drain interval required for draining the fuel tanks 101, 102, 103 of free water.

Whilst in FIG. 2 the NACA duct assemblies 109, 110 are shown disposed at the wing tips 111, 112 it will be appreciated that these may be moved inboard. For an aircraft with wing mounted engines the amount by which the NACA duct assemblies 109, 110 can be moved inboard may be limited but for aircraft with aft mounted engines the NACA duct assemblies 109, 110 can be moved to the wing semi-span position, or even further inboard if desired.

FIG. 3 illustrates an alternative, second embodiment of this invention. Like reference numerals have been used to denote like parts with the first embodiment and only the differences between the first and second embodiments will now be described. In FIG. 3, the NACA duct assemblies 109, 110 have been moved to within the left and right vent-surge tanks 104, 105. The left NACA duct assembly 109 is connected to the left vent-surge tank 104 by a short length of vent line pipework 114', and the right NACA duct assembly 110 is connected to the right vent-surge tank 105 by a short length of vent line pipework 115'. Comparing FIGS. 2 and 3, the second embodiment shown in FIG. 3 has an advantage in that the length of vent line pipework has been reduced. However, the second embodiment is potentially compromised since measures may be required to effectively protect the NACA duct assembly 109, 110 from ingress of water and/or debris at ground.

In both the first and second embodiments described above with reference to FIGS. 2 and 3 the vent-surge tanks 104, 105 are shown disposed within the fuselage 113. However, it will be appreciated that the vent-surge tanks 104, 105 may be disposed just outside the fuselage 113 and occupy an area within the lateral wing tanks 101, 102.

A further progression from the second embodiment described above with reference to FIG. 3 would be to provide a single inboard vent-surge tank within the centre wing tank 103. This design would give a further reduction in vent line pipework, and therefore weight. The single centrally located vent-surge tank may service vent lines from both lateral wing tanks. A reduced complexity of the aircraft design may also give rise to improved assembly times and reduce cost at manufacture.

The design of the vent line pipework is optimised for management of air bubble movement within the fuel tanks, where possible.

Although the invention has been described above with reference to one or more preferred embodiments, it will be appreciated that various changes or modifications may be made without departing from the scope of the invention as defined in the appended claims.

The invention claimed is:

1. An aircraft having a dihedral wing configuration with a wing fuel tank and a vent system for ventilating the fuel tank, the vent system comprising:
a combined vent-surge tank disposed inboard of at least part of the wing fuel tank;
a vent fluidically connecting the vent-surge tank to ambient; and a vent line fluidically connecting the upper part of the fuel tank to the combined vent-surge tank, wherein the vent line has a lowest point thereof at the combined vent-surge tank, and wherein the vent system is configured to transfer at least one of fuel or water collected in the vent-surge tank to an engine of the aircraft without transferring said least one of fuel or water to the fuel tank.

2. An aircraft according to claim 1, wherein the wing fuel tank is a lateral wing fuel tank.

3. An aircraft according to claim 2, further comprising a centre wing fuel tank, wherein the vent system is further configured to ventilate the centre wing tank.

4. An aircraft according to claim 3, further comprising a centre tank vent line fluidically connecting the upper part of the centre wing tank to the combined vent-surge tank, wherein the centre tank vent line has a lowest point thereof at the combined vent-surge tank.

5. An aircraft according to claim 3, wherein the combined vent-surge tank is located within the centre wing tank.

6. An aircraft according to claim 2, wherein the combined vent-surge tank is located within the lateral wing tank.

7. An aircraft according to claim 1, further comprising a scavenging system for scavenging liquid from the bottom of the combined vent-surge tank.

8. An aircraft according to claim 1, wherein the vent includes a duct having an ambient opening.

9. An aircraft according to claim 8, wherein the duct opens to ambient from a lower aerodynamic surface of the aircraft.

10. An aircraft according to claim 8, wherein the duct is a NACA duct or Scoop.

11. An aircraft according to claim 8, wherein the duct is disposed external to and outboard of the combined vent-surge tank.

12. An aircraft according to claim 11, wherein the duct is disposed adjacent the wing tip.

13. An aircraft according to claim 11, further comprising a duct vent line fluidically connecting the duct to the combined vent-surge tank.

14. An aircraft according to claim 13, wherein the duct vent line passes through the fuel tank.

15. An aircraft according to claim 13, wherein the duct vent line has a lowest point thereof at the combined vent-surge tank.

16. An aircraft according to claim 8, wherein the duct is disposed in the combined vent-surge tank.

17. An aircraft having a dihedral wing configuration with a wing fuel tank and a vent system for ventilating the fuel tank, the vent system comprising:

a combined vent-surge tank disposed inboard of at least part of the wing fuel tank;

a vent fluidically connecting the combined vent-surge tank to ambient; and a vent line fluidically connecting the upper part of the fuel tank to the combined vent-surge tank, wherein the vent line has its lowest point at the combined vent-surge tank, and wherein the vent system further comprises a scavenging system configured to scavenge at least one of fuel or water from the combined vent-surge tank and transfer the scavenged at least one of fuel or water to an engine of the aircraft without transferring said at least one of fuel or water to the fuel tank.

* * * * *